US011378087B2

(12) United States Patent
Desmet et al.

(10) Patent No.: US 11,378,087 B2
(45) Date of Patent: Jul. 5, 2022

(54) FAN WITH LEARNING MODE

(71) Applicant: DELTA T, LLC, Lexington, KY (US)

(72) Inventors: James M. Desmet, Louisville, KY (US); Alex Christopher Reed, Lexington, KY (US); Richard A. Oleson, Lexington, KY (US); Marshall White, Lexington, KY (US); Jason Bishop, Lexington, KY (US); Richard Lenser, Lexington, KY (US); David R. Banks, Lexington, KY (US)

(73) Assignee: DELTA T, LLC, Lexington, KY (US)

( * ) Notice: Subject to any disclaimer, the term of this patent is extended or adjusted under 35 U.S.C. 154(b) by 0 days.

(21) Appl. No.: 16/995,148

(22) Filed: Aug. 17, 2020

(65) Prior Publication Data

US 2021/0033098 A1 Feb. 4, 2021

Related U.S. Application Data

(63) Continuation of application No. 15/300,844, filed as application No. PCT/US2015/023582 on Mar. 31, 2015, now Pat. No. 10,746,185.

(Continued)

(51) Int. Cl.
| | |
|---|---|
| *F04D 27/00* | (2006.01) |
| *F04D 25/08* | (2006.01) |
| *F24F 11/77* | (2018.01) |
| *F24F 11/30* | (2018.01) |
| *F24F 110/10* | (2018.01) |

(Continued)

(52) U.S. Cl.
CPC .......... *F04D 27/004* (2013.01); *F04D 25/08* (2013.01); *F04D 25/088* (2013.01); *F24F 11/30* (2018.01); *F24F 11/77* (2018.01); *F24F 11/65* (2018.01); *F24F 2110/10* (2018.01); *F24F 2110/20* (2018.01); *F24F 2120/20* (2018.01)

(58) Field of Classification Search
CPC ...... F04D 25/088; F04D 27/004; F24F 11/07; F24F 110/10
See application file for complete search history.

(56) References Cited

U.S. PATENT DOCUMENTS

| | | | | |
|---|---|---|---|---|
| 5,041,825 A | * | 8/1991 | Hart ....................... | G08C 17/02 340/3.4 |
| 5,627,527 A | * | 5/1997 | Mehta ................... | F04D 27/004 340/3.1 |

(Continued)

FOREIGN PATENT DOCUMENTS

| | | |
|---|---|---|
| JP | A2007263088 | 12/1899 |
| JP | 2011122550 A | 6/2011 |

*Primary Examiner* — Patrick Hamo
(74) *Attorney, Agent, or Firm* — Dickinson Wright PLLC; Andrew D. Dorisio

(57) ABSTRACT

A fan, such as a ceiling fan, includes a learning mode of operation. This learning mode may permit a user to input a desired speed for the fan for a given condition, such as ambient temperature, and adjustments for other conditions would be automatically determined based on the user input. A subsequent selection of fan speed at that condition (such as, for example, for a different user) or a different condition setting would also be obtained, either during initialization or later, and then used as an updated measure of the desired fan speed for the condition. Related methods of controlling the operation of a fan are also disclosed.

15 Claims, 3 Drawing Sheets

Related U.S. Application Data

(60) Provisional application No. 61/972,619, filed on Mar. 31, 2014.

(51) Int. Cl.
*F24F 120/20* (2018.01)
*F24F 110/20* (2018.01)
*F24F 11/65* (2018.01)

(56) References Cited

U.S. PATENT DOCUMENTS

2003/0225542 A1 12/2003 Liu et al.
2010/0215510 A1 8/2010 Tsai et al.

* cited by examiner

FAN WITH LEARNING MODE

This application is a continuation of U.S. application Ser. No. 15/300,844, filed on Sep. 30, 2016, which is a National Stage of PCT/US2015/023582, filed on Mar. 31, 2015, which claims priority to U.S. Provisional Application No. 61/972,619, filed on Mar. 31, 2014, the disclosures of which are hereby incorporated by reference.

TECHNICAL FIELD

This application relates generally to the air handling arts and, more particularly, to a fan having a learning mode of operation.

BACKGROUND OF THE INVENTION

Fans may incorporate temperature sensors to provide a measure of an ambient condition, such as temperature in a space in which the fan is located, in order to regulate the operation of the fan. Of course, the temperature may be subject to wide variability, and it would be desirable for the fan speed to adjust automatically and accordingly in order to ensure that comfort is maximized over a range of conditions. However, merely adjusting the fan speed based on sensed temperature or other conditions does not account for the fact that the user's preferences for a particular fan speed based on the temperature are not taken into account during the operation. For example, a fan speed that one user finds comfortable at one temperature may not be comfortable for that same user when regulated in a lock-step fashion to a different temperature, or for a different user.

Accordingly, a need is identified for a solution that may address any or all of the foregoing limitations, as well as others that have yet to be identified.

SUMMARY

In one aspect of the disclosure, a fan includes a learning mode of operation. The learning mode allows a user to input a desired parameter of operation for the fan, such as speed, for a given environmental condition (such as, for example, temperature), and adjustments for changed conditions may be automatically determined based on the user input. A subsequent selection of a fan parameter at that condition (such as, for example, for a different user) or a different condition setting may also be obtained, either during initialization or later, and then used as an updated measure of the desired fan parameter for the condition. Related methods of controlling the operation of a fan are also disclosed.

In one particular embodiment, an apparatus comprises a fan and a controller for controlling the fan. The controller may be configured for controlling the fan to operate substantially at a first desired fan speed selected by a user for a first ambient condition, and further configured for controlling the fan to operate substantially at a first determined speed at a second ambient condition.

In this or other embodiments, the controller is configured to operate the fan at a plurality of different speeds, each substantially corresponding to a different ambient condition. The user input may be configured for inputting a second desired fan speed, and the controller is configured for: (a) controlling the fan to operate substantially at the second desired fan speed; and (b) regulating the fan to operate substantially at a second determined speed different from the first determined speed at the different ambient condition.

The controller may provide a plurality of fan speeds at a plurality of ambient conditions based on the first desired fan speed. The ambient condition may comprise temperature, humidity, or both temperature and humidity. The controller may be configured to automatically activate and deactivate the fan at a particular ambient condition.

The fan may be positioned in a room for causing air movement in the room, and the ambient condition is a temperature sensed within the room. A sensor may be provided for sensing the ambient condition, including at a location remote from the fan (e.g., on a wall, floor, or other location in a room). A remote controller adapted for communicating wirelessly with the fan may provide user input to the controller for controlling the fan.

A further aspect of the disclosure relates to an apparatus including a fan and a controller configured to regulate the fan speed according to a pre-determined value for each of a plurality of different ambient conditions based on the first desired fan speed provided by a user. The user may provide the desired fan speed by way of a user input is configured for inputting a second desired fan speed, and the controller may be configured for: (a) controlling the fan to operate substantially at the second desired fan speed; and (b) regulating the fan to operate substantially at a second determined speed different from the first determined speed at the different sensed ambient condition.

The ambient condition may comprise temperature, humidity, or both temperature and humidity. The controller may be configured to automatically activate and deactivate the fan at a particular sensed ambient condition. The fan may be positioned in a room for causing air movement in the room, and the ambient condition is a temperature sensed within the room. A sensor may be remote from the fan, and a remote controller adapted for communicating wirelessly with the fan may be used to provide a user input to the controller.

A further part of the disclosure pertains to a method of operating a fan. The method comprises providing a first desired fan speed for a first ambient condition, and providing a second fan speed associated with a second ambient condition based on the first desired fan speed for the first ambient condition. The method may further include the step of operating the fan substantially at the second speed when the second ambient condition is present.

The method may also include the steps of: (a) controlling the fan to operate at the first desired fan speed at the first ambient condition, and (b) controlling the fan to operate at the second fan speed at the second ambient condition. The method may further comprise providing a third desired fan speed via the user input, and: (a) controlling the fan to operate substantially at the third desired fan speed; and (b) regulating the fan to operate at a fourth determined speed at the second ambient condition based on the third desired fan speed. The condition may comprise temperature, humidity, or both temperature and humidity, and the method may further include the step of activating or deactivating the fan at a particular ambient condition.

Still a further aspect of the disclosure relates to a method for controlling a fan. The method comprises regulating the fan speed according to a first pre-determined value for each of a plurality of different ambient conditions based on a first desired fan speed provided by a first user. The method may further include the step of regulating the fan speed according to a second pre-determined value for each of a plurality of different ambient conditions based on a second desired fan speed provided by the first user. The method may further include the step of regulating the fan speed according to a second pre-determined value for each of a plurality of different ambient conditions based on a second desired fan speed provided by a second user.

Yet another aspect of the disclosure pertains to a method of controlling a fan. The method comprises providing a user input for inputting a first desired speed for the fan based on a first ambient condition; providing the user input for inputting a second desired speed for the fan at a second ambient condition; and determining a fan speed for a third ambient condition, including based on the first and second desired speeds at the first and second ambient conditions.

The method may further include the step of providing the user input by way of a first user for using the fan. The method may still further include the step of providing the user input by way of the first user for using the fan or a second user for using the fan.

This disclosure also relates to a method of controlling a fan speed. The method comprises providing a user input for allowing a first user to input a first desired speed for the fan based on a first ambient condition; providing the user input for inputting a second user to input a second desired speed for the fan at a second ambient condition; and determining a fan speed for a third ambient condition, including based on the first and second desired speeds at the first and second ambient conditions (which may be substantially the same). The first user may input the first desired speed prior in time to the second user inputting the second desired speed.

Also described is a method of controlling the operation of a fan in a space. The method comprises providing a user-selected first speed for a first temperature of the space in which the fan is located and a user-selected second speed for a second temperature of the space. The method further comprises operating the fan speed at the first speed at the first temperature and the second speed at the second temperature. The method may further include the step of determining a third speed at a third temperature based on the user-selected first and second speeds.

BRIEF DESCRIPTION OF THE DRAWING FIGURES

DETAILED DESCRIPTION

Figure 1:
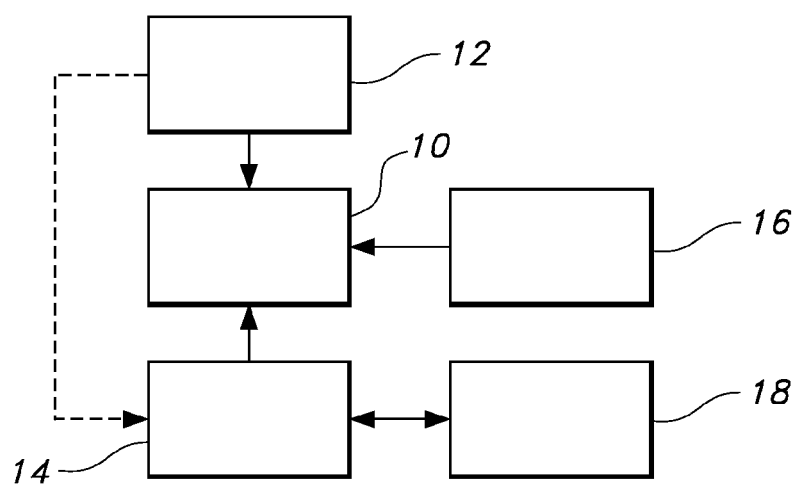
FIG. 1 is a schematic representation of a fan with a control for implementing a learning mode of operation.

Reference is now made to FIG. 1, which schematically illustrates one possible embodiment of a fan 10 according to the present disclosure. The fan 10 may comprise any type of fan, such as for example an overhead ceiling fan including a plurality of blades actuated by an associated motor.

The fan 10 includes at least one sensor 12 to detect an ambient condition, either at the fan location or at a location remote from the fan itself (i.e., not at the precise location where the fan is positioned or within part of the fan itself 10). For example, the sensor 12 may comprise a temperature sensor, which may be part of the fan 10, and may include a sensor for sensing the remote temperature (e.g., a PIR sensor arrangement; see International Patent Application Ser. No. PCT/US15/20998, the disclosure of which is incorporated herein by reference). The sensed temperature may be used by a controller 14 to control the fan 10, such as by activating it, deactivating it, reversing its direction, or otherwise regulating its speed of operation.

In one aspect of the disclosure, a user input 16 is provided for allowing a user to input a fan speed during a learning mode of operation (as contrasted with an automatic mode where the fan speed may be regulated independent of any user input in relation to desired speed). The input 16 may comprise a wired or wireless remote control. As one example, the input 16 may be provided by way of a remote control in the form of a user-specific input device, such as a "smart" phone, computer, or the like, running associated software for communicating the desired value to the fan controller 14 in recognizable form.

In this learning mode, the user inputted speed (e.g., speed A in FIG. 2) is recorded in a memory 18 and stored, along with a sensed temperature (e.g., 72 degrees Fahrenheit) associated with the user input. This recording may be done during an initialization of the fan 10 once installed, or later when a learning mode of operation is selected by the user via the input 16.

Figure 2:
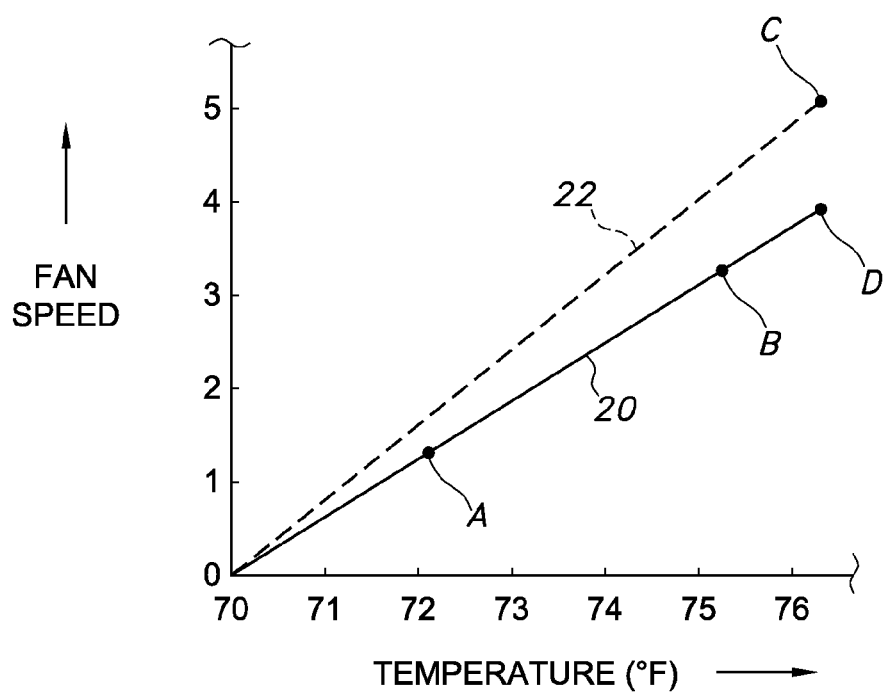
FIG. 2 is a graphical illustration of one aspect of the learning mode of operation.

Based on the user selected speed for a given temperature, the controller 14 may regulate the operation of the fan 10 based on an increase or decrease in temperature from the initial value. For example, if the temperature increases or decreases, the fan 10 may be controlled accordingly (note point B for an increased temperature of 76 degrees Fahrenheit and a corresponding speed increase). This adjustment may be done in accordance with a pre-programmed range of values, as represented by line 20, as shown in FIG. 2. The pre-programmed values may be based on ASHRAE 55 standards stored in the memory 18 in any form (tables, formulae, etc.), or any other stored values obtained using previously obtained data, including possibly empirical data for a particular fan or environment. For the sake of simplicity, these values are shown in FIG. 2 as being arranged in a linear fashion, but may be non-linear as well depending on the approach taken. The fan speed values are also shown as being integers correlating to pre-set speeds (e.g., speed 1 is 10 revolutions per minute, speed 2 is 30 revolutions per minute, etc.), but this is for purposes of illustration only and the speed could be infinitely adjustable within a given range, depending on the sensitivity of the fan motor used.

Later in time, a user (which could be a different user than the one making the initial setting) may adjust the fan speed to a changed speed (e.g., point C), such as by using the input 16. When this later selection is made, the controller 14 associates the changed speed (e.g., point C) with a sensed condition, such as temperature (e.g., 76 degrees Fahrenheit). Based on the changed speed and the known operating condition, the controller 14 may determine that a user has a particular preference different from the pre-programmed value. Accordingly, the controller 14 may adjust the speed value for the corresponding condition so that a new mode of operation is created, as indicated by the dashed line 22 in FIG. 2.

Likewise, if an adjustment is made by a user later in time that is different from the adjustment previously made, the controller 14 may react accordingly. For instance, if a different speed is selected for a sensed temperature (point D for 76 degrees Fahrenheit), then the values may be adjusted (in this case, to correspond to the original values represented by line 20). However, as should be appreciated, it could also be the case that a new set of values is used for a speed selection that is different from one previously used for a given temperature.

As can further be appreciated, the adjustment or adjustments may be made by a particular user or a different user of the fan 10. In the case of a different user later making the adjustment, followed by the earlier user returning and making a different adjustment, the fan 10 via controller 14 would again learn the difference and make a corresponding adjustment. In this way, the regulation of the fan speed in relation to temperature may be continuously adjusted and updated based on user-specific preferences during the learning mode of operation.

During initialization, it is also possible to instruct the user to set a desired speed for a given temperature, and then a different speed based on a different temperature (e.g., value A in FIG. 2). For instance, the user may be prompted to adjust the temperature of the space in which the fan is located, and then adjust the fan speed to the desired level based on the adjusted temperature (e.g., value D in FIG. 2). The controller 14 may then interpolate using the inputted data for provide a range of speeds based on temperature values (e.g., line 20 and value B for 74 degrees Fahrenheit), which may then be subjected to being altered through future adjustments to the fan speed based on a sensed temperature for as long as the learning mode operation is selected. Instead of during initialization, this second value may also be obtained by simply prompting the user about a desired speed during operation at a later time when the sensed temperature is different from the temperature sensed at the time at which the initial speed value was identified by the user.

Figure 3:
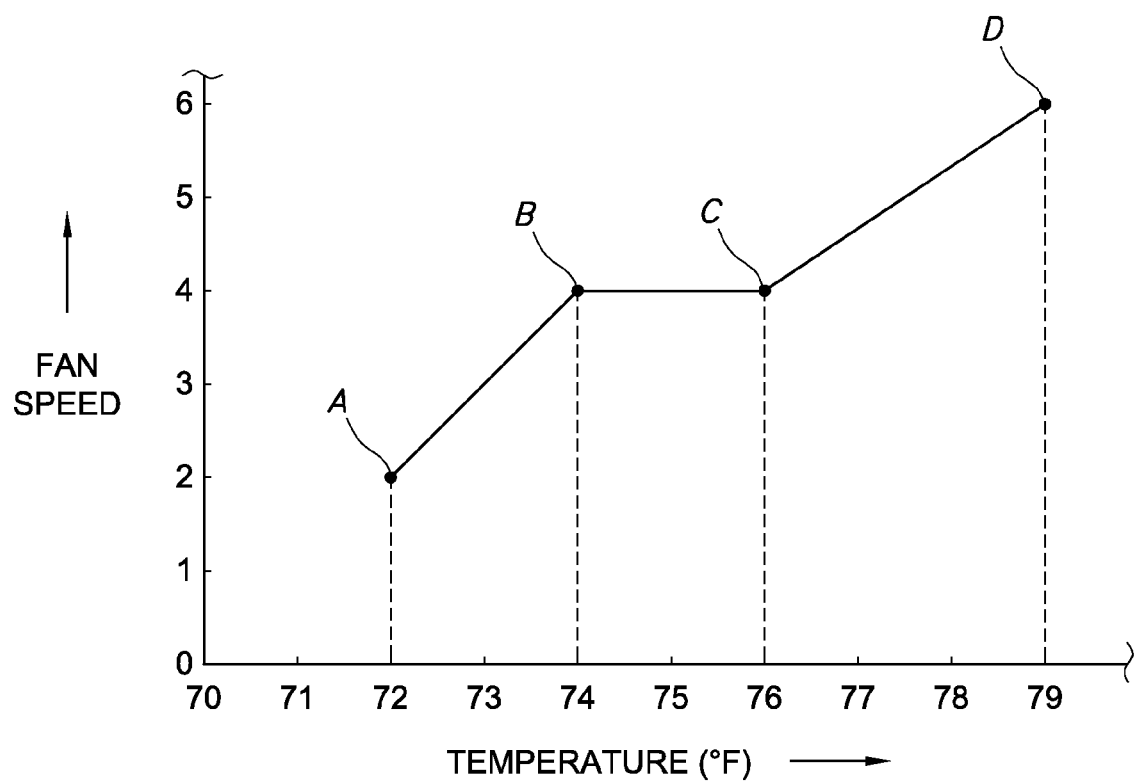
FIG. 3 is a graphical illustration of another aspect of the learning mode of operation.

A further aspect of the disclosure is provided by way of FIG. 3. In this aspect, the user selects an initial set point of speed for a given condition, such as ambient temperature (e.g., point A in FIG. 3). The fan 10 may then operate according to the above embodiment with speed being regulated based on sensed changes in the condition. When a user-selected second speed is inputted, the initial condition is not changed, but rather the user selection at the new condition is simply noted (e.g., point B in FIG. 3). A calculation (e.g., interpolation) may then be made in order to determine additional values of speed based on the condition(s). As further adjustments are made (e.g., points C and D), the calculation may be likewise adjusted.

While the use of temperature exclusively is described above, it should be appreciated that the same approach could be taken using a different ambient condition, such as humidity. Thus, the speed of the fan could be regulated based on a humidity sensed by a humidity sensor. Of course, it is also possible to regulate the speed based on both temperature and humidity. Indeed, the regulation may be based on a heat index, as determined by the following formula:

$$\text{Heat Index} = -42.379 + 2.04901523T + 10.14333127R - 0.22475541TR - 6.83783 \times 10^{-3}T^2 - 5.481717 \times 10^{-2}R^2 + 1.22874 \times 10^{-3}T^2R + 8.5282 \times 10^{-4}TR^2 - 1.99 \times 10^{-6}T^2R^2$$

where:
T—air temperature (F)
R—relative humidity (percentage)

Accordingly, a user's initial or later adjustment of the fan speed may be associated with a particular heat index calculated based on a temperature and humidity measurement.

The conditions in terms of fan speed based on the sensed condition should also be understood to be inexact, such that a temperature being substantially similar to a particular value may be used to regulate the fan at substantially a particular speed, but not necessarily the exact speed. Variations of 10% or more can be expected based on variables such as friction, power, wear, or the like, and will depend on the precise operating conditions encountered in a given situation.

Having shown and described various embodiments, further adaptations of the apparatuses, methods and systems described herein may be accomplished by appropriate modifications by one of ordinary skill in the art without departing from the scope of the disclosure. Several of such potential modifications have been mentioned, and others will be apparent to those skilled in the art. For instance, the examples, embodiments, geometries, materials, dimensions, ratios, steps, and the like discussed above are illustrative and are not required. Accordingly, the scope of the disclosure should be considered in terms of claims that may be presented, and is understood not to be limited to the details of structure and operation shown and described in the specification and drawings.

The invention claimed is:

1. An apparatus, comprising:
a fan;
a user input for allowing a user to input a first desired fan speed at a first ambient condition during a first mode of operation; and
a controller configured to regulate a speed of the fan based on a change to the first ambient condition in the first mode of operation, and wherein the controller is further configured to adjust the speed of the fan based upon a second desired fan speed being inputted by the user at a second ambient condition such that a second mode of operation is created; wherein the controller regulates the speed of the fan in the first mode of operation according to a pre-programmed range of values for a plurality of different ambient conditions, and wherein the speed of the fan in the first mode of operation is infinitely adjustable within the pre-programmed range of values.

2. The apparatus of claim 1, wherein the user input includes a wired or wireless remote control.

3. The apparatus of claim 1, wherein the first desired fan speed is recorded in a memory and stored with the first ambient condition.

4. The apparatus of claim 1, wherein the change to the first ambient condition is an increase or decrease to the first ambient condition.

5. The apparatus of claim 1, wherein the controller continuously adjusts the pre-programmed range of values for the plurality of different ambient conditions based on an inputted desired fan speed by the user at a particular ambient condition in the first mode of operation.

6. An apparatus, comprising:
a fan; and
a controller configured to regulate a speed of the fan according to a pre-programmed value for each of a plurality of different ambient conditions based on a first desired fan speed provided by a first user, and wherein the controller is further configured to regulate the speed of the fan according to a determined value for each of the plurality of different ambient conditions based on a second desired fan speed provided by a second user;
wherein the controller is configured to determine the determined value for each of the plurality of different ambient conditions based upon interpolating the second desired fan speed provided by the second user.

7. The apparatus of claim 6, wherein the fan is an overhead fan.

8. The apparatus of claim 6, wherein the fan includes a plurality of blades actuated by an associated motor.

9. The apparatus of claim 6, wherein the plurality of different ambient conditions include temperature, humidity, or both temperature and humidity.

10. The apparatus of claim 6, further comprising at least one sensor to detect the plurality of different ambient conditions.

11. The apparatus of claim 10, wherein the at least one sensor is remote from the fan.

12. A method of operating a fan, comprising:
determining a first range of fan speeds corresponding to a plurality of different ambient conditions based upon input of a first desired fan speed at a first ambient condition in a first mode of operation;
regulating operation of the fan in the first mode of operation according to the first range of fan speeds; and
adjusting operation of the fan to a second mode of operation based upon input of a second desired fan speed at a second ambient condition, wherein the second mode of operation comprises a new set of fan speeds different from the first range of fan speeds, each of the new set of fan speeds corresponding to the plurality of different ambient conditions, and wherein a first rate of change of fan speed with respect to a change in the ambient condition in the first mode of operation is different from a second rate of change of fan speed with respect to a change in the ambient condition in the second mode of operation.

13. The method of claim 12, including providing a user input for allowing at least one user to input the first desired fan speed at the first ambient condition during the first mode of operation.

14. The method of claim 12, further including storing the first desired fan speed at the first ambient condition in a memory.

15. The method of claim 14, wherein the first range of fan speeds is determined based upon a pre-programmed range of values.

* * * * *